(12) United States Patent
Wang et al.

(10) Patent No.: US 8,534,902 B2
(45) Date of Patent: Sep. 17, 2013

(54) LIGHT GUIDE PLATE WITH OVERLAPPING DIFFUSION NET POINTS, AND ILLUMINATION APPARATUS USING SUCH PLATE

(75) Inventors: Wei-Chih Wang, Hsin-Chu (TW); Chi-Ming Tseng, Hsin-Chu (TW); Wei-Chun Yang, Hsin-Chu (TW); Udo Custodis, Hsin-Chu (TW); Shih-Yuan Yu, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 161 days.

(21) Appl. No.: 12/911,737

(22) Filed: Oct. 26, 2010

(65) Prior Publication Data

US 2011/0242843 A1     Oct. 6, 2011

(30) Foreign Application Priority Data

Apr. 1, 2010   (TW) .............................. 99110143 A

(51) Int. Cl.
*F21V 7/04*            (2006.01)

(52) U.S. Cl.
USPC ........... 362/626; 362/615; 362/620; 362/559; 362/23.09; 362/23.16

(58) Field of Classification Search
USPC ................. 362/612, 615, 617, 619, 620, 623, 362/625, 626, 559, 511, 26, 27, 97.1, 97.4
See application file for complete search history.

(56) References Cited

U.S. PATENT DOCUMENTS

| | | | | |
|---|---|---|---|---|
| 5,005,108 A | * | 4/1991 | Pristash et al. | 362/602 |
| 5,386,347 A | * | 1/1995 | Matsumoto | 362/623 |
| 5,400,224 A | | 3/1995 | DuNah et al. | |
| 5,582,474 A | | 12/1996 | Van Order et al. | |
| 5,584,556 A | * | 12/1996 | Yokoyama et al. | 362/625 |
| 5,980,054 A | * | 11/1999 | Fukui et al. | 362/625 |
| 6,130,777 A | | 10/2000 | Yamashita et al. | |
| 6,425,673 B1 | | 7/2002 | Suga et al. | |
| 6,467,922 B1 | | 10/2002 | Blanc et al. | |
| 6,612,722 B2 | * | 9/2003 | Ryu et al. | 362/615 |
| 6,863,414 B2 | * | 3/2005 | Ho | 362/603 |
| 6,981,792 B2 | * | 1/2006 | Nagakubo et al. | 362/615 |

(Continued)

FOREIGN PATENT DOCUMENTS

DE   102004026585   12/2005
JP   2002107716    4/2002

(Continued)

OTHER PUBLICATIONS

"Search Report of European counterpart application", issued on Jul. 8, 2011, p. 1-p. 5.

(Continued)

*Primary Examiner* — Ismael Negron
(74) *Attorney, Agent, or Firm* — Jianq Chyun IP Office

(57) ABSTRACT

An illumination apparatus includes a light guide plate having a plurality of first and second diffusion net points formed on a surface of a light transmissive substrate, and at least one light emitting element disposed to emit light into a light incident surface of the light guide plate. A portion of the first diffusion net points at least partially overlaps the second diffusion net points, and the size of the first diffusion net points is smaller than the size of the second diffusion net points.

16 Claims, 5 Drawing Sheets

(56) References Cited

U.S. PATENT DOCUMENTS

| | | | |
|---|---|---|---|
| 7,131,764 B2 * | 11/2006 | Hsu et al. | 362/623 |
| 7,478,942 B2 * | 1/2009 | Kim et al. | 362/626 |
| 7,507,012 B2 * | 3/2009 | Aylward et al. | 362/625 |
| 7,559,683 B2 * | 7/2009 | Lee | 362/626 |
| 2003/0030764 A1 | 2/2003 | Lee | |
| 2005/0270802 A1 | 12/2005 | Hsu et al. | |
| 2007/0189040 A1 * | 8/2007 | Chi et al. | 362/625 |
| 2008/0025688 A1 | 1/2008 | Lee et al. | |
| 2008/0130319 A1 * | 6/2008 | Hsung et al. | 362/626 |

FOREIGN PATENT DOCUMENTS

| | | |
|---|---|---|
| JP | 2004281394 | 10/2004 |
| TW | M254682 | 1/2005 |
| TW | M275432 | 9/2005 |
| TW | M277075 | 10/2005 |
| TW | I244566 | 12/2005 |
| TW | M287951 | 2/2006 |
| TW | I259312 | 8/2006 |
| TW | M298750 | 10/2006 |
| TW | 200827779 | 7/2008 |
| TW | M341284 | 9/2008 |
| TW | I303006 | 11/2008 |
| TW | M348296 | 1/2009 |
| TW | M348297 | 1/2009 |
| TW | 200907397 | 2/2009 |
| WO | 0010835 | 3/2000 |
| WO | 2006013969 | 2/2006 |
| WO | 2009079275 | 6/2009 |

OTHER PUBLICATIONS

"Office Action of Japan Counterpart application with English translation", issued on Jun. 26, 2012, p. 1-p. 5., in which the listed references were cited.

"Office Action of Taiwan Counterpart Application(with English translation)", issued on May 22, 2013, p1-p7.

* cited by examiner

US 8,534,902 B2

LIGHT GUIDE PLATE WITH OVERLAPPING DIFFUSION NET POINTS, AND ILLUMINATION APPARATUS USING SUCH PLATE

CROSS-REFERENCE TO RELATED APPLICATION

This application claims the priority benefit of Taiwan application serial no. 99110143, filed on Apr. 1, 2010. The entirety of the above-mentioned patent application is hereby incorporated by reference herein and made a part of this specification.

BACKGROUND OF THE INVENTION

1. Field of the Invention

The invention relates to an optical device and an illumination apparatus, and more particularly to a light guide plate and an illumination apparatus using the light guide plate.

2. Description of Related Art

Conventionally, the light source of the illuminations and the advertisement light boxes are fluorescent lamp tubes, cold cathode fluorescence lamps (CCFLs), and light emitting diodes (LEDs). When the fluorescent lamp tubes or the cold cathode fluorescence lamps are used as the illumination light source, the application products possess the disadvantages of large weight, short lifetime, and low space utilization due to the limitation of the lifetime and the dimension of the light source itself. Besides, since there is trace mercury vapor or solid state mercury within the lamp tube, when the lamps are thrown away or repaired, it is necessary to recycle the lamp tubes to prevent the environment from being polluted.

Accordingly, in the public place, the light emitting diodes are gradually used as the light sources in the advertisement light boxes, the exhibition lamps or bill lamps. The methods for emitting light beams of the light boxes may be generally categorized into the single-sided illumination and two-sided illumination. Typically, the light box with the two-sided illumination includes one or more light emitting diode lamp and two light guide plates. Between the two light guide plates, there is a reflection plate. The aforementioned light box with the two-sided illumination utilizes that the light source laterally emits light beam onto the upper-side light guide plate and the lower-side light guide plate so that the light beam is uniformly transmitted from the upper surface and the lower surface of the light box. Moreover, the net points may be printed on the upper surface and the lower surface of the light guide plate so that the light beam within the light guide plate may be uniformly transmitted from the upper surface and the lower surface of the light guide plate. However, the aforementioned two methods possess the disadvantages. The former method leads to the increasing of the weight and the thickness of the lamp, and the later method leads to the problem of poor brightness.

Taiwan Patent Nos. M298750 and M254682 each disclose an advertisement billboard with the two-sided illumination using two cold cathode fluorescent lamps as the light sources. Taiwan Patent Nos. M341284 and M2777075 each disclose a light box with the two-sided illumination using two light guide plates to achieve the two-sided illumination effect. Moreover, Taiwan Patent Nos. M348297 and M275432 each disclose an advertisement light box. In Taiwan Patent No. M275432, there are micro-structures disposed on the illumination surface.

Also, Taiwan Patent No. M348296 discloses an advertisement light box with various optical films. Moreover, Taiwan Patent Nos. I259312, I244566, I303006, and M287951 disclose backlight modules or displays with the two-sided illuminations.

SUMMARY OF THE INVENTION

The invention provides an illumination apparatus capable of providing two-sided illumination effect.

The invention provides a light guide plate capable of emitting light beams from two surfaces of the light guide plate.

Other objects and advantages of the invention may be further illustrated by the technical features broadly embodied and described as follows.

In order to achieve one or a part of or all of the above advantages or other advantages, an embodiment of the invention provides an illumination apparatus. The illumination apparatus includes a light guide plate and at least a light emitting element. The light guide plate includes a light transmissive substrate, a plurality of first diffusion net points, and a plurality of second diffusion net points. The light transmissive substrate has a first surface, a second surface opposite to the first surface, and a light incident surface connecting the first surface and the second surface. The first diffusion net points are disposed on the second surface. The second diffusion net points are disposed on the second surface. A portion of the first diffusion net points at least partially overlaps the second diffusion net points, and a size of each of the first diffusion net points is smaller than a size of each of the second diffusion net points. The at least one light emitting device is disposed beside the light incident surface and capable of emitting a light beam. The light beam is capable of entering the light guide plate through the incident surface and being transmitted to an outside of the illumination apparatus through the first surface and the second surface.

Furthermore, one embodiment of the invention provides a light guide plate. The light guide plate includes a light transmissive substrate, a plurality of first diffusion net points, and a plurality of second diffusion net points.

In summary, the embodiment or the embodiments of the invention may have at least one of the following advantages. In the embodiment of the invention, since the two-sided illumination effect is achieved by manufacturing the diffusion net points on a single light guide plate twice, the dimension of the illumination apparatus may be decreased and the light emitting efficiency of the illumination apparatus may be increased.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3B is a schematic diagram showing a human vision perception while the light emitting element is turned on.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

First Embodiment

Figure 1A:
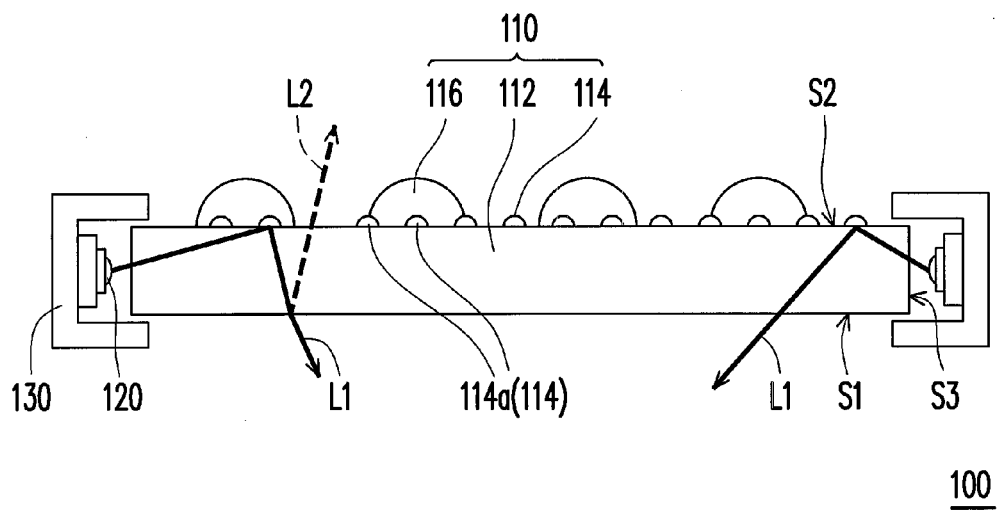
FIG. 1A is a cross-sectional view of an illumination apparatus of the first embodiment of the invention.
Figure 1B:
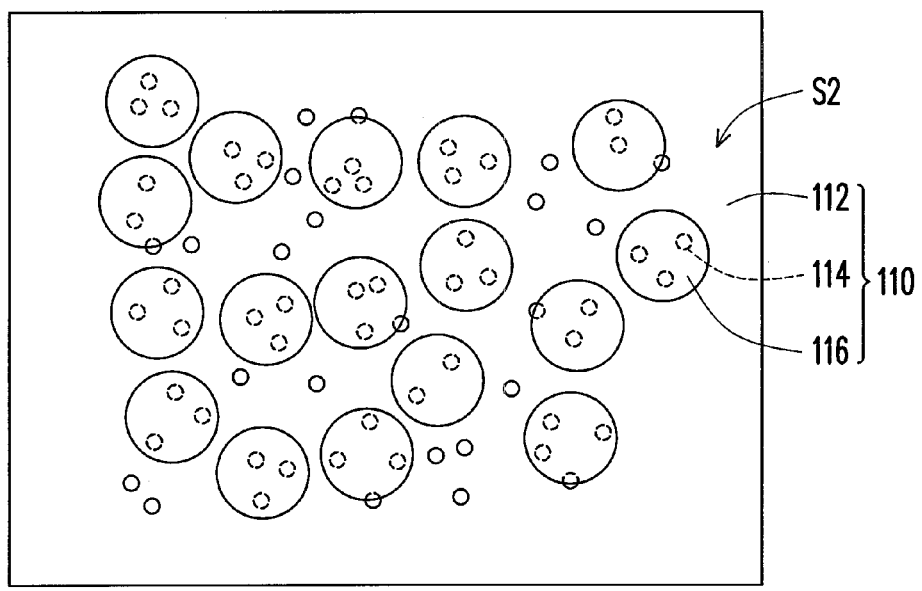
FIG. 1B is a top view of the light guide plate shown in FIG. 1A.

Referring to FIGS. 1A and 1B, an illumination apparatus 100 includes a light guide plate 110 and a least one light emitting element 120 (two light emitting elements 120 are drawn for representation). The light emitting elements 120 may be, for example but not limited to, light emitting diodes (LEDs), and may be, for example, the light sources with different colors. In addition, the illumination apparatus 100 of this embodiment further includes an outer frame 130, and the light emitting element 120 is disposed within the outer frame 130.

As shown in FIG. 1A and FIG. 1B, the light guide plate 110 includes a light transmissive substrate 112, a plurality of diffusion net points 114, and a plurality of diffusion net points 116. The material of the light transmissive substrate 110 may be, for example, poly methyl methacrylate (PMMA), and PMMA is the so-called acrylic material. As shown in FIG. 1A, the light transmissive substrate 112 has a surface S1, a surface S2 opposite to the surface S1, and a light incident surface S3 connecting the surface S1 and the surface S2. The thickness of the light transmissive substrate 110 is smaller than 6 millimeters, for example. The diffusion net points 114 are disposed on the surface S2, and the diffusion net points 116 are disposed on the surface S2 as well. On the other hand, there are no diffusion net points 114 or 116 disposed on the surface S1. Furthermore, the light emitting element 120 is disposed beside the light incident surface S3 and capable of emitting a light beam L1. The light beam L1 is capable of entering the light guide plate 110 through the light incident surface S3 and being transmitted to an outside of the illumination apparatus 100 through the surfaces S1 and S2.

Moreover, a portion of the diffusion net points 114 at least partially overlaps the diffusion net points 116, and a size of each of the diffusion net points 114 is smaller than a size of each of the diffusion net points 116. Further, in the embodiment, each of the diffusion net points 116 covers a portion 114a of the diffusion net points 114, and the portion 114a of the diffusion net points 114 is disposed between the diffusion net points 116 and the surface S2. In addition, the diameter of each of the diffusion net points 114 is within a range from greater than or equal to 0.25 millimeters to less than or equal to 2 millimeters. The diameter of each of the diffusion net points 116 is greater than or equal to 4 millimeters, for example. In one embodiment, a ratio of a diameter of each of the diffusion net points 116 to a diameter of each of the diffusion net points 114 is within a range from greater than or equal to 2 to less than or equal to 10.

As shown in FIG. 1A, the diffusion net points 114 and 116 may break the total reflection of the light beam, such as light beam L1, in the light transmissive substrate 112, so that the light beam L1 emits from the surface S1. Moreover, a portion of the light beam, such as the light beam L2, reflected to the surface S1 by the diffusion net points 114 and 116 is reflected by the surface S1 and then emits from the surface S2 of the transmissive substrate 112. Accordingly, the light beams L1 and L2 emitted by the light emitting element 120 are transmitted to the outside of the illumination apparatus 100 respectively through the surfaces S1 and S2, so that the illumination apparatus 100 has the two-sided illumination effect. In other words, in the embodiment, there is no device disposed on the surface S1 for completely blocking the light beam L1 from the surface S1 so as to avoid the light beam L1 from the surface S1 being transmitted to the outside of the illumination apparatus 100. Also, there is no device disposed on the surface S2 for completely blocking the light beam L2 from the surface S2 so as to avoid the light beam L2 from the surface S2 being transmitted to the outside of the illumination apparatus 100.

In the present embodiment, the diffusion net points 114 and 116 are manufactured, for example, by the two-time printing process. Specifically, after the uniformly distributed diffusion net points 114 are manufactured, the diffusion net points 116 are manufactured by the second-time screen printing process, for example. Generally, the dimension or the number of the diffusion net points 116 may affect the light emitting rates of the surfaces S1 and S2. Thus, by adjusting the dimension or the number of the diffusion net points 116, the light emitting rates of the surfaces S1 and S2 may be controlled. In the present embodiment, on the light transmissive substrate 110, the surface S1, comparing with the surface S2 having the diffusion net points 114 and 116, has a relatively higher light emitting rate.

Table 1 shows the simulated data of the shielding rate of the diffusion net points 116 versus the light emitting rates of the surfaces S1 and S2. The shielding rate of the diffusion net points 116 is the area ratio of the diffusion net points 116 to the surface S2. That is, the larger the shielding rate is, the larger the dimension or the number of the diffusion net points is.

TABLE 1

| Shielding rate | Surface S1 | Surface S2 |
|---|---|---|
| 0% | 54.33% | 45.67% |
| 12.57% | 58.16% | 41.84% |
| 18.1% | 61.52% | 38.48% |
| 24.63% | 65.31% | 34.69% |
| 32.17% | 71.14% | 28.86% |
| 40.72% | 77.68% | 22.32% |
| 41.62% | 78.46% | 21.54% |
| 48.27% | 85.17% | 14.83% |

Figure 2:
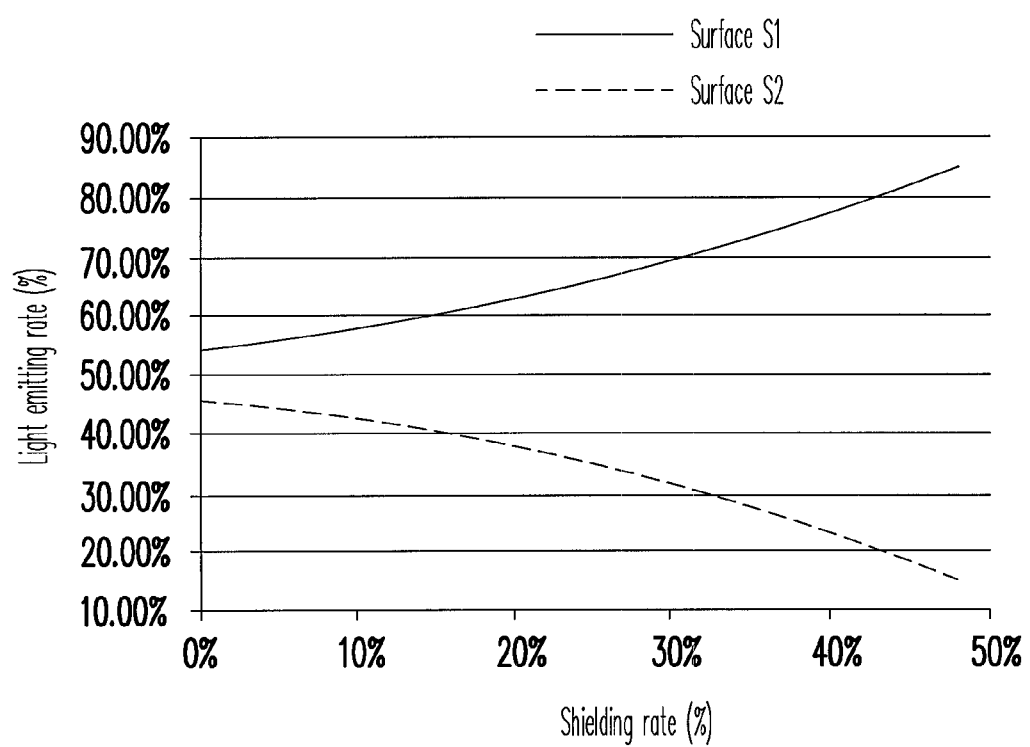
FIG. 2 is a diagram depicting a profile of the shielding rate versus the light emitting rate.

According to Table 1, when the diffusion net points 116 are not disposed on the surface S2 (which means the shielding rate of the diffusion net points 116 is 0%), the light emitting ratio of the surface S1 to the surface S2 is about 55:45. However, when the area ratio of the diffusion net points 116 to the surface S2 is increased (which means the shielding rate of the diffusion net points 116 is increased), the light emitting ratio of the surface S1 and the surface S2 is accordingly changed. Specifically, the light emitting rate of the surface S1 is increased with the increasing of the shielding rate of the diffusion net points 116. Nevertheless, the light emitting rate of the surface S2 is decreased with the increasing of the shielding rate of the diffusion net points 116. As shown in FIG. 2, the light emitting rate of the surface S1 is increased with the increasing of the shielding rate, and the light emitting rate of the surface S2 is decreased with the increasing of the shielding rate. Thus, under the particular shielding rate, the light emitting ratio of the surface S1 to the surface S2 may be controlled at about 6:4, 7:3 or 8:2. Hence, the light distribution applications of different lamps may be implemented.

For instance, the illumination apparatus 100 of the embodiment may be used in the perfect diffusion illumination and the half indirect illumination. In the perfect diffusion illumination apparatus, the illumination rates of the surfaces S1 and S2 are about 40%~60%. In the half indirect illumination apparatus, the illumination rates of the surfaces S1 and S2 are about 60%~90% and 10%~40%, respectively. The surface with the relatively high illumination rate may be used as an indoor direct illumination, and the surface with the relatively low illumination rate may be used as an indoor indirect illumination. Also, since the illumination apparatus 100 may decrease glare effect without being arranged with any grating plate, the unified glare rating (UGR) is decreased, so that the average illumination of the illumination apparatus 100 is higher than the average illumination of the conventional illumination apparatus. The decreasing of UGR represents a better glare prevention. The relation equation of UGR is:

$$UGR = 8\log \frac{0.25}{L_b} \sum \frac{L^2 \omega}{P^2}$$

$L_b$ denotes background brightness (cd/m$^2$), L denotes the luminance of the light emitting portion of a single lamp in a direction of viewer's eyes (cd/m$^2$), ω denotes the solid angle (sr) of the light emitting portion of the lamp composed in the direction of viewer's eyes, and P denotes the Guth position index of the position of the glare source relative to the position of the line of vision of the viewer.

Moreover, the shape of the illumination apparatus 100 may be designed according to the requirements, and the shape may be a rectangle, a round shape or a polygon.

Figure 1C:
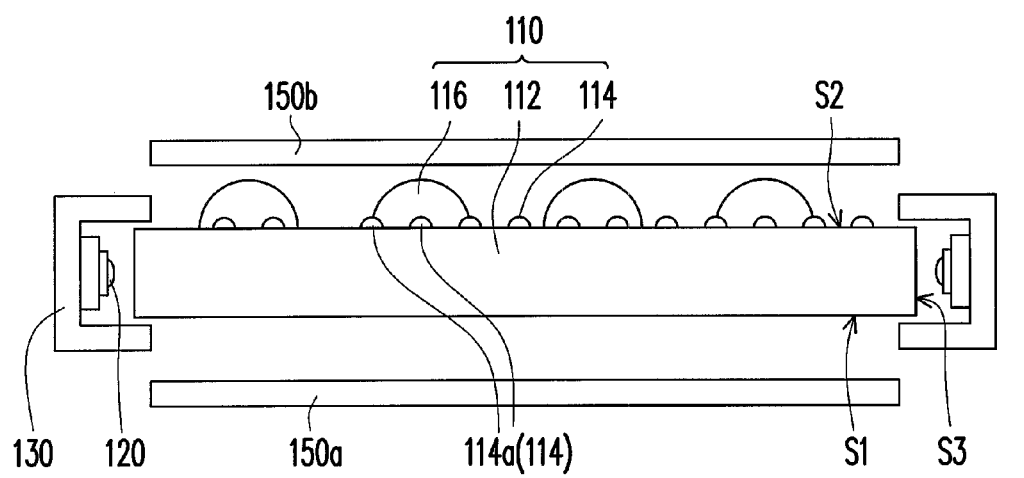
FIG. 1C is a cross-sectional view of an illumination apparatus of another embodiment of the invention.

In the present embodiment, the material of the diffusion net points 114 and 116 may be, for example, is polymethyl methacrylate (PMMA) or other plastics. Further, diffusion particles such as titanium oxide (TiO$_2$) may be added into the diffusion net points 114 and 116. By adjusting the composition or the material composition ratio of the diffusion net points 114 and 116, the light transmittance of the light transmittsive substrate 122 may be controlled so as to adjust the light emitting rates of the light beams L1 and L2 from the surfaces S1 and S2. Table 2 shows the illumination data of the surfaces S1 and S2 versus diffusion net points made of different materials. Further, the data listed in Table 2 are under the circumstance that there are diffusion plates arranged on the surfaces S1 and S2. As shown in FIG. 1C, the diffusion plates 150a and 150b are disposed on the surfaces S1 and S2, respectively.

TABLE 2

| | Material I | Material II | Material III |
|---|---|---|---|
| Illumination on Surface S2 (Lux) | 4692 | 4550 | 4230 |
| Illumination on Surface S1 (Lux) | 4993 | 5031 | 5092 |
| Surface S2/Surface S1 | 93.97% | 90.44% | 83.07% |

The material I listed in Table 2 is a solvent printing material, and the fabricating method of the net points is oven baking to harden the material. The material II is an ultraviolet (UV) printing material, and the fabricating method of the net points is using ultraviolet light to cure and harden ink. The material III is a UV inkjet material, and the fabricating method of the net points is ultraviolet curing, and the net points are micro-lens structures. As shown in Table 2, the transmittance of the light transmissive substrate 112 is related to the material of the net points. Thus, the designer may design the desirable illumination effect by choosing the suitable material for the net points. Moreover, in another embodiment of the invention, the whole light emitting efficiency of the illumination apparatus may also be enhanced without arranging the diffusion plates on the surfaces S1 and S2.

Figure 3A:
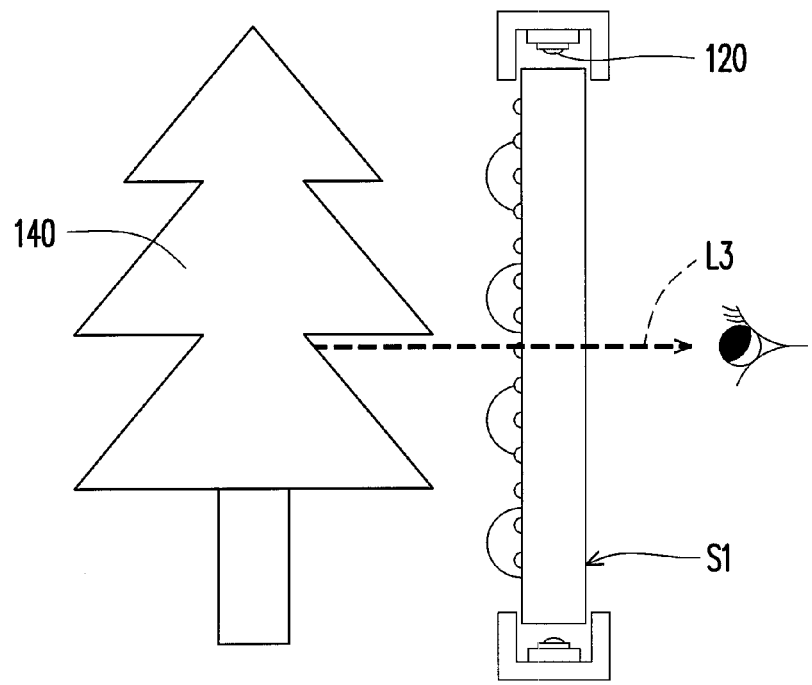
FIG. 3A is a schematic diagram showing a human vision perception while the light emitting element is turned off.
Figure 3B:
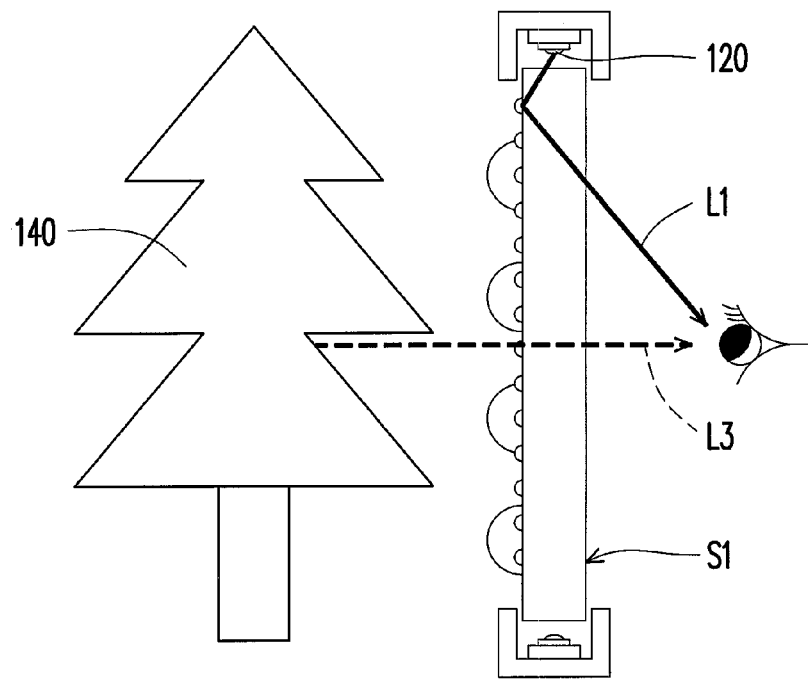

Also, as shown in FIG. 3A, since the light guide plate 110 of the present embodiment is made of high light transmissive material, the light beam L3 from the object 140 may be easily perceived by human eyes when the light emitting element 120 is turned off. On the other hand, as shown in FIG. 3B, when the light emitting element 120 is turned on, the light beam L1 with the relatively high intensity is suitable for entering the human eyes through the light guide plate 110 so that the human may not perceive the light beam L3 with the relatively low intensity. Thus, the human may not perceive the existence of the object 140. In another view, the illumination apparatus 110 provides a function of light wall.

The aforementioned concept may be applied to the design of partition in a room or space. For instance, the illumination apparatus 110 may be used as the wall for partitioning the indoor space. Specifically, when the light emitting element 120 is turned off, the transmissive feature of the light guide plate 110 makes the human eyes to see through the light guide plate 110 so that the human may perceive more opened space. On the other hand, when the light emitting element 120 is turned on, the light wall generated by the illumination apparatus 110 may effectively partition the space so as to provide a more private space. That is, the brightness of the light emitting element 120 makes the human eyes hard to perceive the object 140 so that human senses that the transmittance generated by the illumination apparatus 100 is decreased.

Second Embodiment

Figure 4:
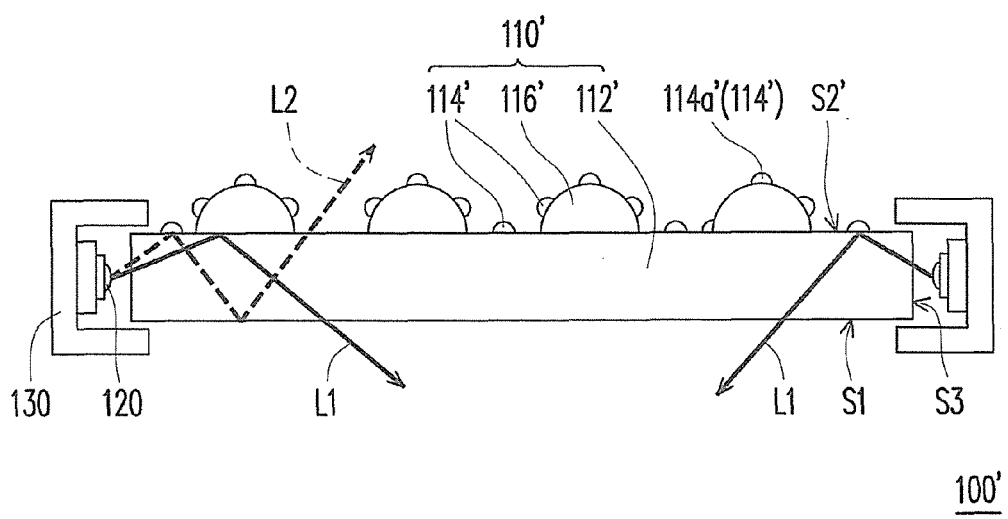
FIG. 4 a schematic cross-sectional view of an illumination apparatus 100' of the second embodiment of the invention.

FIG. 4 a schematic cross-sectional view of an illumination apparatus 100' of the second embodiment of the invention. The illumination apparatus 100' and the illumination apparatus 100 shown in FIG. 1A are similar to each other, and the difference between the illumination apparatus 100' and the illumination apparatus 100 is that a portion 114a' of the diffusion net points 114' of the illumination apparatus 100' is disposed on the diffusion net points 116', and the diffusion net points 116' are disposed between the portion 114a' of the diffusion net points 114' and the surface S2'. Similarly, by using the aforementioned arrangement, the illumination apparatus 100' also provides two-sided illumination effect. The details and the variations of the illumination apparatus 100' are similar to the illumination apparatus 100 described in the first embodiment and are not described herein.

In summary, the embodiment or the embodiments of the invention may have at least one of the following advantages. In one embodiment of the invention, since the two-sided illumination effect is achieved by manufacturing the diffusion net points on a single light guide plate twice, the dimension of the illumination apparatus is decreased and the light emitting efficiency of the illumination apparatus is increased. Moreover, since the manufacturing process of the light guide plate is simple, the cost for manufacturing the illumination apparatus is decreased.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A light guide plate, comprising:
   a light transmissive substrate having a first surface, a second surface opposite to the first surface, and a light incident surface connecting the first surface and the second surface;
   a diffusion pattern composed of a plurality of first diffusion net points, a plurality of second diffusion net points, and a plurality of void areas, wherein the diffusion pattern is disposed on the second surface, wherein a portion of the first diffusion net points at least partially overlaps the second diffusion net points, a size of each of the first diffusion net points is smaller than a size of each of the second diffusion net points, the first diffusion net points and the second diffusion net points do not completely fill the entire second surface, and a distance exists between each of the first diffusion net points, wherein the second diffusion net points only comprises protruded net points.

2. The light guide plate of claim 1, wherein each of the second diffusion net points covers a portion of the first diffusion net points, and the portion of the first diffusion net points is disposed between the second diffusion net points and the second surface.

3. The light guide plate of claim 1, wherein a portion of the first diffusion net points is disposed on the second diffusion net points, and the second diffusion net points are disposed between the portion of the first diffusion net points and the second surface.

4. The light guide plate of claim 1, wherein a diameter of each of the first diffusion net points is within a range from greater than or equal to 0.25 millimeters to less than or equal to 2 millimeters.

5. The light guide plate of claim 1, wherein a diameter of each of the second diffusion net points is greater than or equal to 4 millimeters.

6. The light guide plate of claim 1, wherein a ratio of a diameter of each of the second diffusion net points to a diameter of each of the first diffusion net points is within a range from greater than or equal to 2 to less than or equal to 10.

7. The light guide plate of claim 1, wherein there is no diffusion net points disposed on the first surface.

8. An illumination apparatus, comprising:
   a light guide plate, comprising:
      a light transmissive substrate having a first surface, a second surface opposite to the first surface, and a light incident surface connecting the first surface and the second surface;
   a diffusion pattern composed of a plurality of first diffusion net points, a plurality of second diffusion net points, and a plurality of void areas, wherein the diffusion pattern is disposed on the second surface, wherein a portion of the first diffusion net points at least partially overlaps the second diffusion net points, a size of each of the first diffusion net points is smaller than a size of each of the second diffusion net points, the first diffusion net points and the second diffusion net points do not completely fill the entire second surface, and a distance exists between each of the first diffusion net points, wherein the second diffusion net points only comprises protruded net points; and
   at least a light emitting element disposed beside the light incident surface and capable of emitting a light beam, wherein the light beam is capable of entering the light guide plate through the light incident surface and being transmitted to an outside of the illumination apparatus through the first surface and the second surface.

9. The illumination apparatus of claim 8, wherein each of the second diffusion net points covers a portion of the first diffusion net points, and the portion of the first diffusion net points is disposed between the second diffusion net points and the second surface.

10. The illumination apparatus of claim 8, wherein a portion of first diffusion net points is disposed on the second diffusion net points, and the second diffusion net points are disposed between the portion of the first diffusion net points and the second surface.

11. The illumination apparatus of claim 8, wherein a diameter of each of the first diffusion net points is within a range from greater than or equal to 0.25 millimeters to less than or equal to 2 millimeters.

12. The illumination apparatus of claim 8, wherein a diameter of each of the second diffusion net points is greater than or equal to 4 millimeters.

13. The illumination apparatus of claim 8, wherein a ratio of a diameter of each of the second diffusion net points to a diameter of each of the first diffusion net points is within a range from greater than or equal to 2 to less than or equal to 10.

14. The illumination apparatus of claim 8, wherein the at least one light emitting element is a light emitting diode.

15. The illumination apparatus of claim 8, wherein a device for completely blocking the light beam emitted from the first surface to avoid the light beam emitted from the first surface being transmitted to the outside of the illumination apparatus is not disposed on the first surface, and a device for completely blocking the light beam emitted from the second surface to avoid the light beam emitted from the second surface being transmitted to the outside of the illumination apparatus is not disposed on the second surface.

16. The illumination apparatus of claim 8, wherein there is no diffusion net points disposed on the first surface.

\* \* \* \* \*